(12) United States Patent
Sutterfield et al.

(10) Patent No.: US 11,274,630 B2
(45) Date of Patent: Mar. 15, 2022

(54) EXHAUST NOZZLE WITH VANE SUPPORT STRUCTURE FOR A GAS TURBINE ENGINE

(71) Applicants: Rolls-Royce North American Technologies Inc., Indianapolis, IN (US); Rolls-Royce Corporation, Indianapolis, IN (US)

(72) Inventors: David L. Sutterfield, Greenwood, IN (US); Jack D. Petty, Indianapolis, IN (US); Bryan H. Lerg, Carmel, IN (US); Andrew Sanderson, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 83 days.

(21) Appl. No.: 16/803,535

(22) Filed: Feb. 27, 2020

(65) Prior Publication Data
US 2021/0270207 A1 Sep. 2, 2021

(51) Int. Cl.
| | |
|---|---|
| *F02K 1/04* | (2006.01) |
| *F02K 1/08* | (2006.01) |
| *F02K 1/52* | (2006.01) |
| *B64D 33/04* | (2006.01) |

(52) U.S. Cl.
CPC .............. *F02K 1/04* (2013.01); *B64D 33/04* (2013.01); *F02K 1/08* (2013.01); *F02K 1/52* (2013.01); *F05D 2250/34* (2013.01)

(58) Field of Classification Search
CPC ..... F02K 1/04; F02K 1/78; F02K 1/80; F02K 1/82; F02K 1/08; F02K 1/52
See application file for complete search history.

(56) References Cited

U.S. PATENT DOCUMENTS

| | | | | |
|---|---|---|---|---|
| 2,692,724 | A | * | 10/1954 | McLeod ................... F02K 1/04 417/352 |
| 3,829,020 | A | | 8/1974 | Stearns |
| 4,043,508 | A | | 8/1977 | Speir et al. |
| 4,244,294 | A | | 1/1981 | Frignac et al. |
| 4,295,611 | A | | 10/1981 | Wynosky et al. |
| 4,527,388 | A | | 7/1985 | Wallace, Jr. |
| 4,592,508 | A | * | 6/1986 | Thornock ................. F02K 1/08 239/265.19 |
| 4,802,629 | A | | 2/1989 | Klees |
| 4,864,818 | A | * | 9/1989 | Taylor ....................... F23R 3/60 60/766 |
| 5,014,999 | A | | 5/1991 | Makhobey |
| 5,503,407 | A | | 4/1996 | McNickle |

(Continued)

FOREIGN PATENT DOCUMENTS

EP 2302266 A1 3/2011

OTHER PUBLICATIONS

Extended European Search Report, European Application No. 19218056.0-1015, dated May 29, 2020, 8 pages.

*Primary Examiner* — Craig Kim
(74) *Attorney, Agent, or Firm* — Barnes & Thornburg LLP (57) ABSTRACT

An exhaust nozzle for use with a gas turbine engine includes an outer shroud and a nozzle-plug assembly coupled to the outer shroud. The nozzle-plug assembly includes an inner plug and at least one support vane that is coupled to the outer shroud to support the inner plug in an exhaust nozzle flow path.

20 Claims, 4 Drawing Sheets

(56) References Cited

U.S. PATENT DOCUMENTS

| | | | |
|---|---|---|---|
| 7,174,704 B2 * | 2/2007 | Renggli | F02K 1/386 |
| | | | 60/204 |
| 7,178,338 B2 | 2/2007 | Whurr | |
| 7,886,518 B2 | 2/2011 | Moniz et al. | |
| 7,900,433 B2 * | 3/2011 | McCall | F02K 3/06 |
| | | | 60/226.1 |
| 8,850,823 B2 * | 10/2014 | Ress, Jr | F02K 7/10 |
| | | | 60/770 |
| 9,181,899 B2 | 11/2015 | Dindar et al. | |
| 10,400,621 B2 | 9/2019 | Sawyers-Abbott et al. | |
| 2009/0142180 A1 | 6/2009 | Munson | |
| 2010/0095650 A1 | 4/2010 | Schafer | |
| 2012/0192543 A1 | 8/2012 | Aeberli et al. | |
| 2013/0111906 A1 * | 5/2013 | Bouchard | F02C 7/24 |
| | | | 60/694 |
| 2013/0227952 A1 * | 9/2013 | Grip | B64C 3/48 |
| | | | 60/770 |
| 2014/0157782 A1 * | 6/2014 | Kramer | F23R 3/60 |
| | | | 60/752 |
| 2016/0115904 A1 * | 4/2016 | Sutterfield | F02C 7/28 |
| | | | 60/770 |
| 2016/0200443 A1 * | 7/2016 | Bellabal | F01D 25/16 |
| | | | 415/213.1 |

\* cited by examiner

EXHAUST NOZZLE WITH VANE SUPPORT STRUCTURE FOR A GAS TURBINE ENGINE

FIELD OF THE DISCLOSURE

The present disclosure relates generally to gas turbine engines, and more specifically to exhaust nozzles for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of combustion (hot gas) are directed into the turbine where work is extracted to drive the compressor and, sometimes, an output shaft. Left-over products of combustion may be released out of the turbine through an exhaust nozzle, where they are directed away from the engine.

Exhaust nozzles may encounter relatively high temperatures due to their proximity to the turbine and the hot gas discharged therefrom. Accordingly, supporting various components in the exhaust nozzle while considering these relatively high temperatures remains an area of interest.

SUMMARY

The present disclosure may comprise one or more of the following features and combinations thereof.

According to one aspect of the present disclosure, a gas turbine engine may include an engine core and an exhaust nozzle. The engine core may include a compressor configured to receive and compress an airflow, a combustor configured to receive a compressed airflow from the compressor and combust the compressed airflow to produce hot, high-pressure combustion products, and a turbine configured to interact with the high-pressure combustion products. The exhaust nozzle may be configured to receive the high-pressure combustion products from the engine core and discharge the high-pressure combustion products to the atmosphere.

In some embodiments, the exhaust nozzle includes an outer shroud arranged circumferentially about an axis to define an outer boundary surface of an exhaust nozzle flow path and a nozzle-plug assembly arranged in the exhaust nozzle flow path. The nozzle-plug assembly may include an inner plug, at least one support vane, and an expansion-permissive link that interconnects the inner plug to the support vane to support the inner plug.

In some embodiments, the inner plug may be arranged circumferentially about the axis to define an inner boundary surface of the exhaust nozzle flow path. The least one support vane may extend between the outer shroud and the inner plug through the exhaust nozzle flow path. The expansion-permissive link may allow for thermal expansion and contraction of the inner plug and the support vane relative to one another as a temperature of the exhaust nozzle changes.

In some embodiments, the support vane includes a vane-support frame that interconnects the outer shroud and the inner plug to support the inner plug in the exhaust nozzle flow path and an outer vane shell coupled to the vane-support frame to provide an outer flow path boundary for the at least one support vane.

In some embodiments, the vane-support frame includes a plurality of support beams and an endplate coupled to the plurality of support beams. The inner plug may include a plug support frame that is spaced apart from the endplate by a first distance when the exhaust nozzle is in a cold-build state and is spaced apart from the endplate by a second distance, less than the first distance, when the exhaust nozzle is in a hot-use state.

In some embodiments, the expansion-permissive link includes a load shaft that extends through apertures formed in both the endplate and the plug-support frame, a first bearing sleeve positioned between the load shaft and the endplate of the vane-support structure, and a second bearing sleeve positioned between the load shaft and the plug-support frame. The load shaft may be configured to translate relative to the first and second bearing sleeves as the exhaust nozzle changes between the cold-build state and the hot-use state.

In some embodiments, the plurality of support beams include a first set of support beams that extend forward from the inner plug at an acute angle relative to the axis and a second set of support beams that extend transversely to the first set of support beams. Each of the support beams of the second set may interconnect at least two of the support beams of the first set. Each of the support beams of the second set may extend perpendicularly to each of the support beams of the first set.

In some embodiments, the inner plug further includes an outer plug shell that defines a vane-receiving space and receives a portion of the outer vane shell therein. The outer vane shell may translate relative to the outer plug shell as the exhaust nozzle changes between the cold-build state and a hot-use state.

According to another aspect of the present disclosure, an exhaust nozzle for a gas turbine engine includes an outer shroud and a nozzle-plug assembly. The outer shroud may be arranged circumferentially about an axis to define an outer boundary surface of an exhaust nozzle flow path. The nozzle-plug assembly may include an inner plug arranged circumferentially about the axis to define an inner boundary surface of the exhaust nozzle flow path and a support vane that extends between the outer shroud and the inner plug through the exhaust nozzle flow path. In some embodiments, the inner plug includes a plug support frame and an outer vane shell and the support vane includes a vane support frame and an outer vane shell.

In some embodiments, the exhaust nozzle further includes an expansion-permissive link that interconnects the plug support frame and the vane support frame to transfer loads from the inner plug, through the support vane, and to the outer shroud. The expansion-permissive link may be configured to allow movement of the support vane relative to the plug support frame between a cold-build state position, in which the vane support frame is spaced apart from the plug support frame by a first distance, and a hot-use state position, in which the vane support frame is spaced apart from the plug support frame by a second distance less than the first distance.

In some embodiments, the vane-support frame includes a plurality of support beams and an endplate coupled to the plurality of support beams, and the expansion-permissive link interconnects the plug support frame to the plurality of support beams and the endplate of the vane-support frame.

In some embodiments, the expansion-permissive link includes a load shaft that extends through apertures formed in both the endplate and the plug-support frame, a first bearing sleeve positioned between the load shaft and the endplate of the vane-support structure, and a second bearing sleeve positioned between the load shaft and the plug-support frame. The load shaft is configured to translate relative to the first and second bearing sleeves as the exhaust nozzle changes between the cold-build state and a hot-use state.

In some embodiments, the nozzle-plug assembly includes a first support vane and a second support vane that each interconnect the inner plug and the outer shroud and the expansion-permissive link includes a first support rod coupled to the first support vane and a second support rod coupled to the second support vane.

In some embodiments, the first support rod and the second support rod are coupled together and extend axially forward and radially away from the axis to provide a v-shaped expansion-permissive link that allows thermal growth of the first and second vanes in axial and radial directions relative to the axis.

In some embodiments, the plurality of support beams include a first set of support beams that extend forward from the inner plug at an acute angle relative to the axis and a second set of support beams that extend transversely to the first set of support beams. Each of the support beams of the second set interconnect at least two of the support beams of the first set. Each of the support beams of the second set extend perpendicularly to each of the support beams of the first set.

In some embodiments, the outer plug shell defines a vane-receiving space and receives a portion of the outer vane shell therein and the outer vane shell translates relative to the outer plug shell as the exhaust nozzle changes between the cold-build state and a hot-use state.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
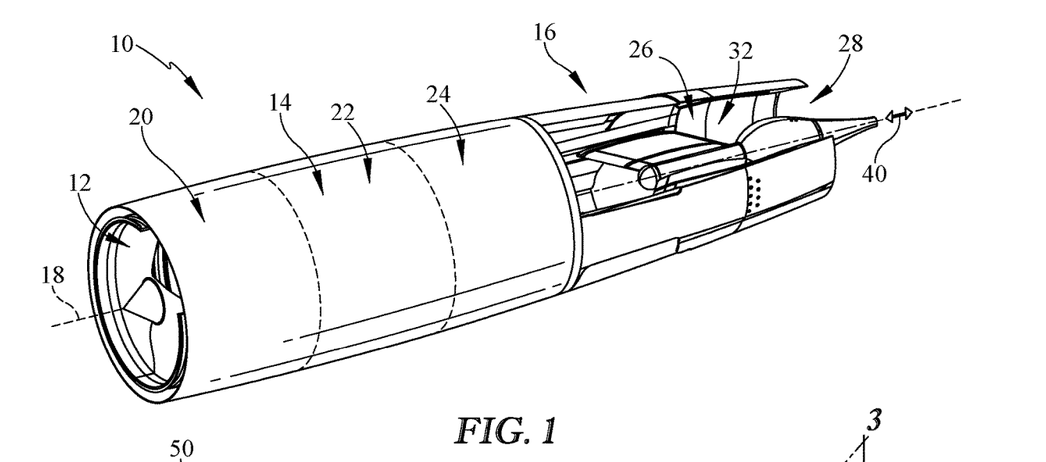
FIG. 1 is a perspective view of a gas turbine engine that includes a fan, an engine core, and an exhaust nozzle arranged downstream of the engine core with a section of the exhaust nozzle cut away to show that the exhaust nozzle includes an outer shroud and a nozzle-plug assembly mounted to the outer shroud within the flow path of the exhaust nozzle.

An aerospace gas turbine engine 10 is shown in FIG. 1 and includes a fan 12, an engine core 14, and an exhaust nozzle 16. The fan 12 is coupled to the engine core 14 for rotation by the engine core 14 about an axis 18 during use of the gas turbine engine 10. The engine core 14 receives and combusts fuel to drive rotation of the fan 12 via one or more shafts (not shown). The exhaust nozzle 16 is located axially aft of the engine core 14 and is configured to expel exhaust products produced by the engine core 14 downstream into the atmosphere.

The engine core 14 includes a compressor section 20, a combustor section 22, and a turbine section 24 as suggested in FIG. 1. The compressor section 20 compresses and delivers pressurized air to the combustor section 22. The combustor section 22 mixes fuel with the pressurized air received from the compressor section 20 and ignites the fuel. The hot, high-pressure products of the combustion reaction in the combustor section 22 are directed into the turbine section 24 to cause portions of the turbine section 24 to rotate about the axis 18 and drive portions of the compressor section 20. The fan 12 is also coupled to the turbine section 24 by at least one of the shafts driven in rotation by the engine core 14 and provides thrust for propelling an air vehicle coupled with the gas turbine engine 10 when that fan 12 is rotated by the turbine section 24. The exhaust products of the engine core 14 are directed into the exhaust nozzle 16 where a flow of the exhaust products are manipulated by the exhaust nozzle 16 prior to being released into the atmosphere.

Figure 2:
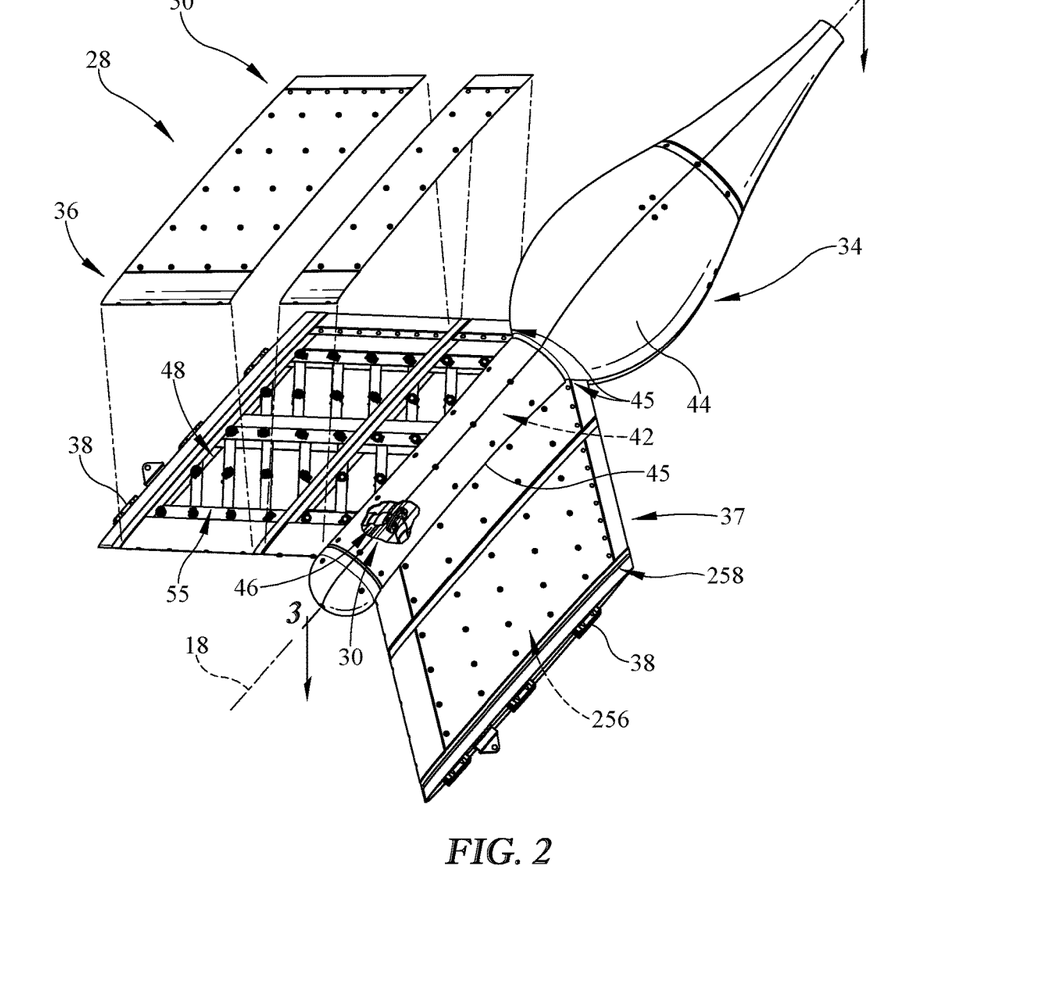
FIG. 2 is a perspective view of the nozzle-plug assembly of FIG. 1 showing that the nozzle-plug assembly includes an inner plug arranged along a central axis of the gas turbine engine, a pair of support vanes that support the inner plug within the flow path of the exhaust nozzle, and an expansion-permissive link that interconnects portions of the inner plug and portions of the support vanes to transfer loads between the inner plug and the support vanes while allowing for thermal expansion of the nozzle-plug assembly during use.

The exhaust nozzle 16 includes an outer shroud 26 and a nozzle-plug assembly 28 as shown in FIGS. 1 and 2. The outer shroud 26 extends circumferentially around the axis 18. The nozzle-plug assembly 28 cooperates with the outer shroud 26 to form an exhaust nozzle flow path 32 therebetween. The exhaust products from the engine core 14 flow downstream through the exhaust nozzle flow path 32 from the engine core 14 to the atmosphere. The nozzle-plug assembly 28 may translate axially relative to the outer shroud 26 to change the shape of the exhaust nozzle flow path 32 to optimize the flow of exhaust products for low noise emissions during take-off or increased engine efficiency at cruise.

Figure 3:
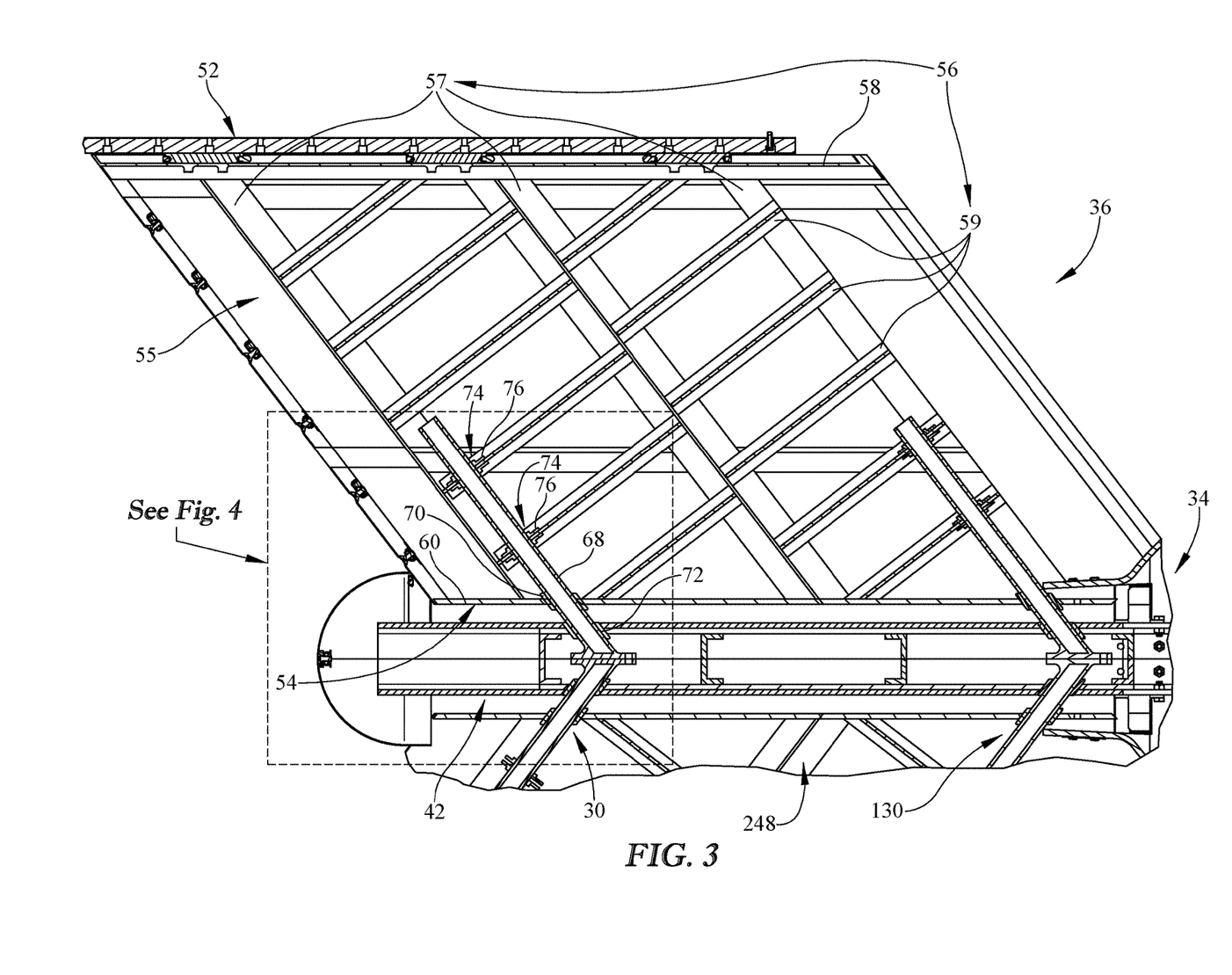
FIG. 3 is a cross sectional view of one of the support vanes and a portion of the inner plug taken along line 3-3 in FIG. 2 showing that the support vanes include a vane-support frame and the inner plug includes a plug support frame and showing that the expansion-permissive link interconnects the plug support frame and the vane support frame to transfer loads therebetween.

The nozzle-plug assembly 28 includes an inner plug 34, at least one support vane 36 coupled to the outer shroud 26 and the inner plug 34, and an expansion-permissive link 30 as shown in FIGS. 1-3. The inner plug 34 is arranged on the axis 18 and is supported in the exhaust nozzle flow path 32 by the expansion-permissive link 30 and the support vane 36. The support vane 36 is swept forward and is mounted to a track 38 in the outer shroud 26 for movement forward and aft relative to the axis 18 as suggested by the arrows 40 in FIG. 1. The expansion-permissive link 30 interconnects the inner plug 34 and the support vane 36 to transfer loads from the inner plug 34 to the outer shroud 26 while allowing for thermal expansion and contraction of the nozzle-plug assembly 28. In the illustrative embodiment, the exhaust nozzle 16 includes forward and aft expansion-permissive links 30, 130 as shown in FIG. 3.

The inner plug 34 includes a plug-support frame 42 and an outer plug shell 44 as shown in FIGS. 2 and 3. The plug-support frame 42 is arranged within an internal space 46 defined by the outer plug shell 44. The outer plug shell 44 covers the plug-support frame 42 to provide an aerodynamic outer flow path boundary for the inner plug 34. The plug-support frame 42 is coupled to the outer plug shell 44 to support the outer plug shell 44 in the exhaust nozzle flow path 32.

The plug-support frame 42 is also coupled to the expansion-permissive link 30 to transfer loads from the inner plug 34, through the support vane 36, and to the outer shroud 26 as shown in FIGS. 2 and 3. The support vane 36 includes a vane-support frame 48 and an outer vane shell 50. The vane-support frame 48 is arranged within an internal space 55 defined by the outer vane shell 50. The outer vane shell 50 covers the vane-support frame 48 to provide an aerodynamic outer boundary of the support vane 36. The vane-support frame 48 is fixed to the outer shroud 26 at a first end 52 of the vane-support frame 48 and is coupled to the expansion-permissive link 30 at or near a second end 54 of the vane-support frame 48 as shown in FIG. 3. The expansion-permissive link 30 interconnects the second end 54 of the vane-support frame 48 and the plug-support frame 42 to transfer loads between the plug-support frame 42 and the vane-support frame 48.

The vane-support frame 48 includes a plurality of support beams 56, a first endplate 58 at the first end 52 of the vane-support frame 48, and a second endplate 60 at the second end 54 of the vane-support frame 48 as shown in FIG. 3. The plurality of support beams 56 are coupled to one another to interconnect the first endplate 58 and the second endplate 60. The first endplate 58 is fixed to the outer shroud 26 to anchor the support vane 36 at the outer shroud, in the illustrative embodiment. The expansion-permissive link 30 interconnects the second endplate 60 and the plug-support frame 42 to transfer loads from the plug-support frame 42 to the vane-support frame 48. In the illustrative embodiment, the expansion-permissive link 30 is also coupled to some of the support beams 56 to provide additional support and reduce a moment of force of the expansion-permissive link 30 on the second endplate 60.

Figure 4:
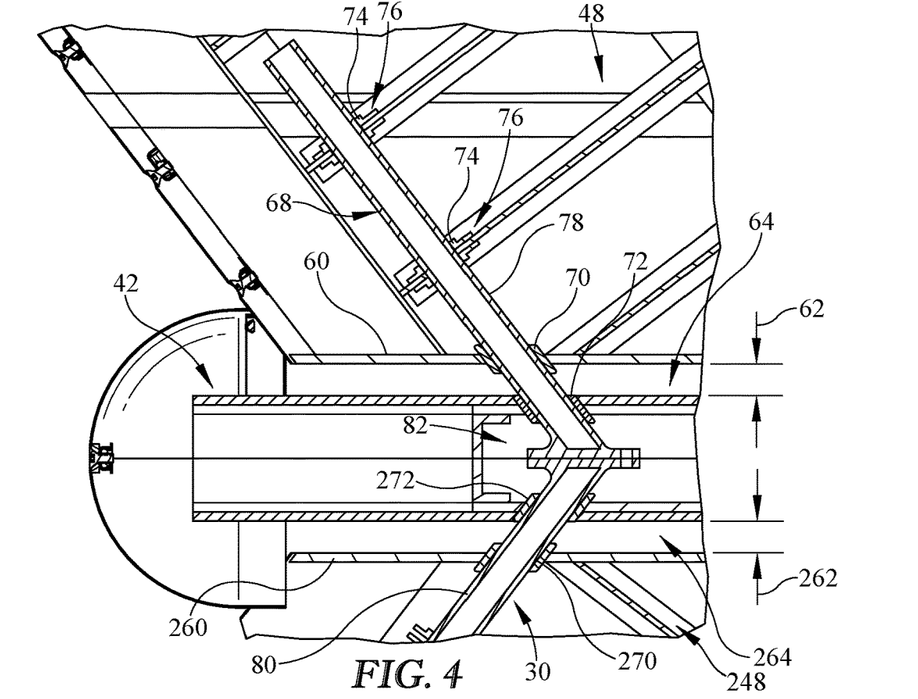
FIG. 4 is an enlarged view of a portion of FIG. 3 of the exhaust nozzle in a cold-build state showing the vane support frame spaced apart from the plug support frame by a first distance to provide a clearance gap therebetween which decreases as a temperature of the exhaust nozzle raises, as shown in FIG. 5, to accommodate thermal growth of the vane support frame and/or the plug support frame.

The exhaust nozzle 16 is positioned directly downstream of the engine core 14. The hot exhaust products from the engine core 14 may cause thermal expansion of some components in the exhaust nozzle 16 as the exhaust nozzle changes from a cold-build state to a hot-use state during use as suggested in FIGS. 4 and 5. To comply with these thermal expansion effects, the second endplate 60 is spaced apart from the plug-support frame 42 by a first distance 62 as shown in FIG. 4. The first distance 62 is sized to provide a clearance gap 64 between the vane-support frame 48 and the plug-support frame 42 in the illustrative embodiment. In some embodiments, the first endplate 58 may be spaced apart from the outer shroud 26 to provide a clearance gap while second endplate 60 is anchored to plug-support frame 42.

Figure 5:
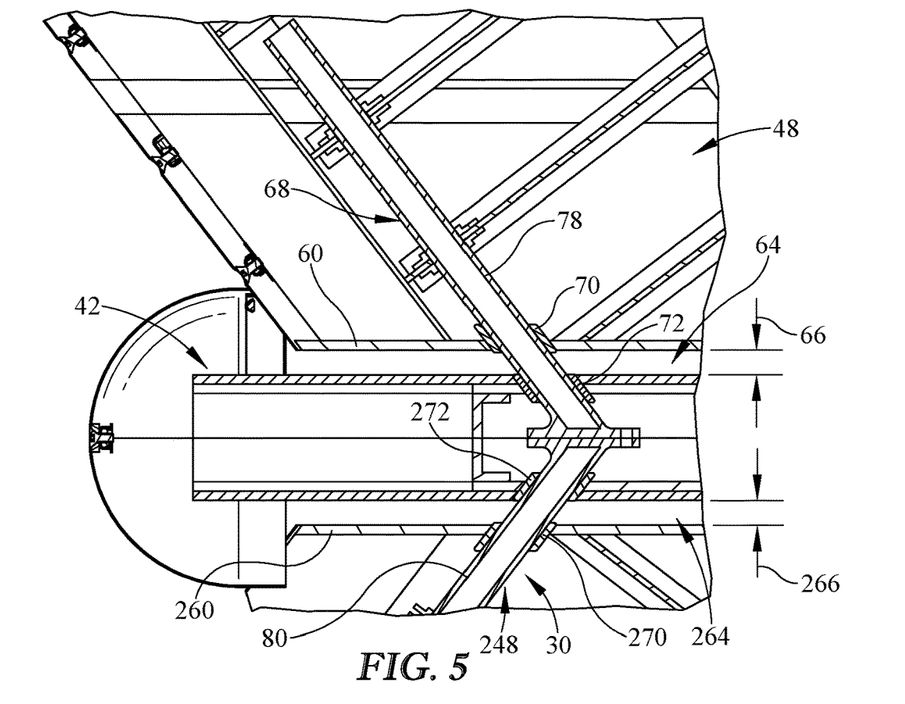
FIG. 5 is a cross sectional view similar to FIG. 4 of the exhaust nozzle in a hot-use state showing the vane support frame spaced apart from the plug support frame by a second distance that is less than the first distance after the clearance gap has decreased to accommodate thermal growth of the vane support frame and/or the plug support frame.

The plug-support frame 42 and/or the vane-support frame 48 are configured to translate relative to one another while being supported by the expansion-permissive link 30 as the exhaust nozzle 16 changes between the cold-build state and the hot-use state as suggested in FIGS. 4 and 5. The clearance gap 64 allows the vane-support frame 48 to thermally expand toward the plug-support frame 42 as the exhaust nozzle 16 changes from the cold-build state to the hot-use state. As the vane-support frame 48 expands, the second endplate 60 moves toward the plug-support frame 42 to decrease the clearance gap 64. In the hot-use state, the second endplate 60 is spaced apart from the plug-support frame 42 by a second distance 66 that is less than the first distance 62 as shown in FIG. 5. In some embodiments, the plug-support frame 42 may also thermally expand toward the vane-support frame 48 to contribute to the decrease in the clearance gap 64.

The outer plug shell 44 defines a vane-receiving space 45 as shown in FIG. 2. The vane-receiving space receives a portion of the outer vane shell 50 therein. As the vane-support frame 48 translates toward the plug-support frame 42, the outer vane shell 50 may also translate relative to the outer plug shell 44 as the exhaust nozzle changes between the cold-build state and the hot-use state. In the illustrative embodiment, the outer vane shell 50 is mounted to the vane-support frame 48 for thermal expansion and contraction independent of the vane-support frame 48.

In the illustrative embodiment the expansion-permissive link 30 includes a load shaft 68, a first bearing sleeve 70 positioned between the load shaft 68 and the endplate 60 of the vane-support frame 48, and a second bearing sleeve 72 positioned between the load shaft 68 and the plug-support frame 42. The load shaft 68 extends through apertures formed in both the endplate 60 and the plug-support frame 42. The bearing sleeves 70, 72 are fixed to the endplate 60 and the plug-support frame 42, respectively, such that the load shaft 68 translates relative to at least one of the bearing sleeves 70, 72 in response to thermal expansion and contraction of the inner plug 34 and/or the support vane 36. The bearing sleeves 70, 72 cooperate with the load shaft 68 to provide plain bearings between the support vane 36 and the load shaft 68 and between the inner plug 34 and the load shaft 68. The load shaft 68 is free floating relative to the plug-support frame 44 and the vane support frame 48 due to the bearing sleeves 70, 72.

The expansion-permissive link 30 may further include one or more additional bearing sleeves 74 and corresponding brackets 76 as shown in FIGS. 3 and 4. The additional bearing sleeves 74 and brackets 76 may be provided to couple the load shaft 68 to other components of the vane-support frame 48 to provide increased support. For example, in the illustrative embodiment, the additional brackets 76 are fixed in position to the plurality of support beams 56. The bearing sleeves 74 are positioned between the brackets 76 and the load shaft 68 to allow the load shaft 68 to translate relative to the brackets 76 and bearing sleeves 74 in response to thermal expansion and contraction of the inner plug 34 and/or the support vane 36.

In the illustrative embodiment, the vane-support frame 48 and the load shaft 68 are made from material suitable for the environment that they operate in. The bearing sleeves 70, 72, 74 may also be made from a metallic material and formed as a sleeve and may include an anti-friction/anti-wear coating to decrease wear and friction between the bearing sleeves 70, 72, 74 and the load shaft 68. The bearing sleeves 70, 72, 74 and the load shaft 68 are close-coupled and depend on one another for efficient operation. They may use material couples selected for favorable wear and friction characteristics depending on temperatures of the environment in which the exhaust nozzle is used.

The plurality of support beams 56 include a first set of support beams 57 and a second set of support beams 59 that extend transversely to the first set of support beams 57 as shown in FIG. 3. The first set of support beams 57 extend forward from the inner plug 34 at an acute angle relative to the central axis between the first endplate 58 and the second endplate 60. Each of the support beams of the second set 59 extend perpendicularly to each of the support beams of the first set 57 and interconnect at least two of the support beams of the first set 57. In the illustrative embodiment, each of the support beams of the first set 57 are larger than each of the support beams of the second set 59 to transfer greater loads between the endplates 58, 60 to the outer shroud 26.

In the illustrative embodiment shown in FIGS. 1-5, the nozzle-plug assembly 28 includes a first support vane 36 and a second support vane 37 that each interconnect the inner plug 34 and the outer shroud 26. The expansion-permissive link 30 is coupled to both of the support vanes 36, 37 and the inner plug to transfer loads therebetween while allowing for thermal growth of portions of the support vanes 36, 37. The load shaft 68 of the expansion-permissive link 30 includes a first support rod 78 that interconnects the plug-support frame 42 and the first support vane 36 and a second support rod 80 that interconnects the plug-support frame 42 and the second support vane 37. The first support rod 78 and the second support rod 80 are coupled together along the axis 18 within a space 82 defined by plug-support frame 42. The first support rod 78 and the second support rod 80 are fastened together in the illustrative embodiment but may be coupled by another suitable means such as by welding, brazing, or soldering for example. The first support rod 78 and the second support rod 80 extend axially forward and radially away from the central axis to provide the expansion-permissive link 30 with a v-shape that allows thermal growth of the first and second vanes in axial and radial directions relative to the central axis 18.

The first support vane 36 and the second support vane 37 are identical except that they are swept forward away from the inner plug 34 in opposite directions relative to the axis 18. Each support rod 78, 80 is swept forward in the same direction as its respective support vane 36, 37. The first support rod 78 is coupled to the plug-support frame 42 and the vane-support frame 48 of the first support vane 36 by bearing sleeves 70, 72, 74 as described above. Support vane 37 includes a vane support frame 248 that is similar to vane-support frame 48 and includes a plurality support beams 256, a first end plate 258 and a second endplate 260. The second support rod 80 is coupled to the vane support frame 248 by passing through apertures in the second endplate 260 and the plug-support frame 42. Bearing sleeves 270, 272, similar to bearing sleeves 70, 72, are placed between the second support rod 80 and the plug-support frame 42 and between the second support rod 80 and the second endplate 260.

Both endplates 60, 260 are configured to translate toward one another and toward the plug-support frame 42 as temperature of the exhaust nozzle increases. A clearance gap 264 is defined between the second endplate 260 and the plug-support frame 42 and is similar to clearance gap 64, as shown in FIGS. 4 and 5. The clearance gap 264 has a first distance 262 when the exhaust nozzle is in the cold-build state as shown in FIG. 4. As a temperature of the exhaust nozzle 16 increases, the clearance gap 264 decreases similarly to clearance gap 64. The clearance gap 264 has a second distance 266 between the plug-support frame 42 and the second endplate 260 when the exhaust nozzle 16 is in the hot-use state. Distances 62 and 66 are the same as distances 262 and 266 in the illustrative embodiment, however, they may be different from one another in other embodiments.

Figures 6, 7:
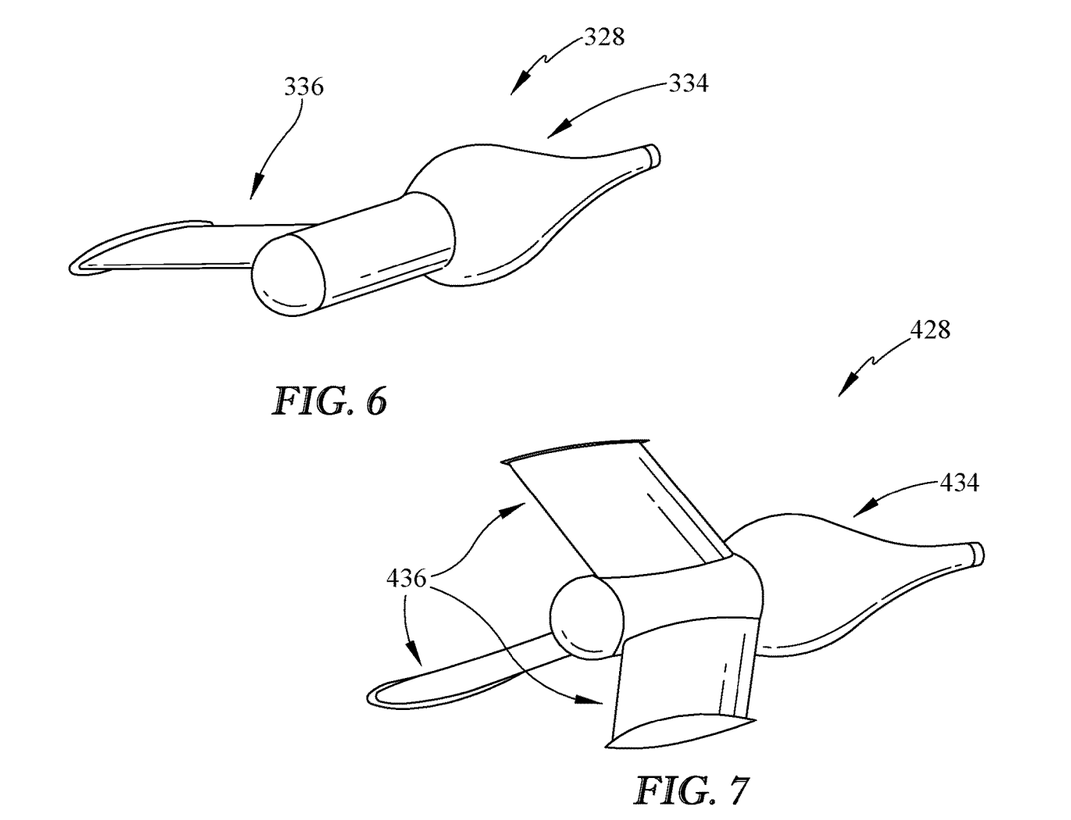
FIG. 6 is a perspective view of another embodiment of a nozzle-plug assembly adapted for use with the gas turbine engine of FIG. 1 and that includes an inner plug and a single support vane.
FIG. 7 is a perspective view of another embodiment of a nozzle-plug assembly adapted for use with the gas turbine engine of FIG. 1 and that includes an inner plug and three support vanes.

Another embodiment of a nozzle-plug assembly 328 that may be used with exhaust nozzle 16 is shown in FIG. 6. Nozzle-plug assembly 328 is substantially similar to nozzle-plug assembly 28 shown in FIGS. 1-5 except that nozzle-plug assembly 328 includes an inner plug 334 and a single support vane 336. Accordingly, the disclosure above for nozzle-plug assembly 28 is incorporated by reference herein for nozzle-plug assembly 328.

Another embodiment of a nozzle-plug assembly 428 that may be used with exhaust nozzle 16 is shown in FIG. 7. Nozzle-plug assembly 428 is substantially similar to nozzle-plug assembly 28 shown in FIGS. 1-5 except that nozzle-plug assembly 428 includes an inner plug 434 and three support vanes 436. Accordingly, the disclosure above for nozzle-plug assembly 28 is incorporated by reference herein for nozzle-plug assembly 428.

Figure 8:
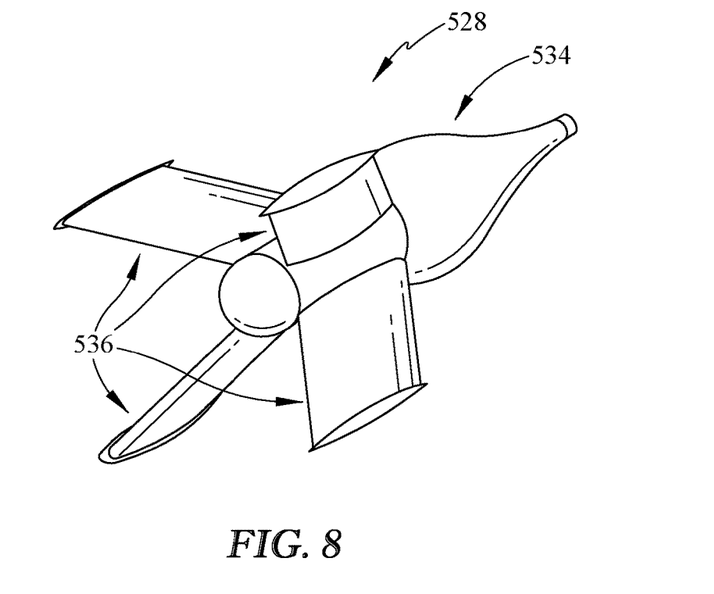
FIG. 8 is a perspective view of another embodiment of a nozzle-plug assembly adapted for use with the gas turbine engine of FIG. 1 and that includes an inner plug and four support vanes.

Another embodiment of a nozzle-plug assembly 528 that may be used with exhaust nozzle 16 is shown in FIG. 8. Nozzle-plug assembly 528 is substantially similar to nozzle-plug assembly 28 shown in FIGS. 1-5 except that nozzle-plug assembly 528 includes an inner plug 534 and four support vanes 536. Accordingly, the disclosure above for nozzle-plug assembly 28 is incorporated by reference herein for nozzle-plug assembly 528. In other embodiments any number of support vanes may be used to support an inner plug such as inner plug 34, 334, 434, 534.

In some embodiments, the gas turbine engine 10 may be used on an aircraft that supports supersonic flight. The engine 10 include an exhaust nozzle 16 that may have an integral thrust reverser and the ability to vary the nozzle throat area. The nozzle-plug assembly 28 (a nozzle that incorporates an aft centerbody) may provide a broad efficiency peak across operating ranges of the gas turbine engine 10. The shaping of the inner and outer flow path lines may provide efficient operation at the cruise point and quiet operation during takeoff.

In some embodiments, the plug is supported by vanes that are attached to the exhaust nozzle case (outer shroud 26) and transfer load to the case to the nozzle support system. The plug 34 may be supported by 2, 3 or 4 or more vanes 36 as suggested in FIGS. 6-8. The vanes may be allowed to grow thermally without adversely affecting the operation of the system, while at the same time passing large aerodynamic loads from the plug to the case.

In some embodiments, the nozzle-plug assembly 28 is thermally compliant (it allows thermal growth without thermally induced loads). This may be accomplished by fixing the vane on one end (anchoring this end so that it does not move relative to the surrounding structure) and allowing the other end of the vane to grow as influenced by temperature (thermal growth). Depending on the application, it is sometimes advantageous to anchor the outer end of the vane (next to the support case) and let the inner end grow, and at other times the inner end of the vane may be anchored and the outer end may grow.

The vane 36 includes an internal structure (vane-support frame 48) that are thermally disassociated from the vane skin (vane shell 50) that forms the flow path of the vane and from the plug internal structure (plug-support frame 42). The vane-support frame 48 may be fixed to the outer support case and can grow thermally (without influencing the skin) by the vane structure inside ends growing together (there are gaps placed between them to allow this inward growth) in the direction of the centerbody. In some embodiments, a central shafting system (expansion-permissive link 30) that is held by the internal structure with bearing sleeves that allow the internal structure to slide with respect to the shafts and still pass loads from the center body to the support case. The centerbody support holds the central shaft from each vane.

In some embodiments, since the vane structure grows thermally inward (into the centerbody), a joint may be needed in the aerodynamic surfaces of the vane and centerbody to permit this movement. The internal arrangement of the centerbody support for a three and four vane configuration may have some minor variations, but the concept discussed above would remain the same.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
an engine core including a compressor configured to receive and compress an airflow, a combustor configured to receive a compressed airflow from the compressor and combust the compressed airflow to produce hot, high-pressure combustion products, and a turbine configured to interact with the high-pressure combustion products, and
an exhaust nozzle configured to receive the high-pressure combustion products from the engine core and discharge the high-pressure combustion products to the atmosphere, the exhaust nozzle including an outer shroud arranged circumferentially about an axis to define an outer boundary surface of an exhaust nozzle flow path and a nozzle-plug assembly arranged in the exhaust nozzle flow path,
wherein the nozzle-plug assembly includes an inner plug arranged circumferentially about the axis to define an inner boundary surface of the exhaust nozzle flow path, at least one support vane that extends between the outer shroud and the inner plug through the exhaust nozzle flow path, and an expansion-permissive link that interconnects the inner plug to the support vane to support the inner plug in the exhaust nozzle flow path while allowing thermal expansion and contraction of the inner plug and the support vane relative to one another,
wherein the support vane includes a vane-support frame that interconnects the outer shroud and the inner plug to support the inner plug in the exhaust nozzle flow path and an outer vane shell coupled to the vane-support frame to provide an outer flow path boundary for the at least one support vane, and
wherein the vane-support frame includes a plurality of support beams and an endplate coupled to the plurality of support beams and wherein the inner plug includes a plug support frame that is spaced apart from the endplate by a first distance when the exhaust nozzle is in a cold-build state and is spaced apart from the endplate by a second distance, less than the first distance, when the exhaust nozzle is in a hot-use state.

2. The gas turbine engine of claim 1, wherein the expansion-permissive link includes a load shaft that extends through apertures formed in both the endplate and the plug-support frame, a first bearing sleeve positioned between the load shaft and the endplate of the vane-support structure, and a second bearing sleeve positioned between the load shaft and the plug-support frame.

3. The gas turbine engine of claim 2, wherein the load shaft is configured to translate relative to the first and second bearing sleeves as the exhaust nozzle changes between the cold-build state and the hot-use state.

4. The gas turbine engine of claim 1, wherein the inner plug further includes an outer plug shell that defines a vane-receiving space and receives a portion of the outer vane shell therein.

5. The gas turbine engine of claim 4, wherein the outer vane shell translates relative to the outer plug shell as the exhaust nozzle changes between the cold-build state and a hot-use state.

6. An exhaust nozzle for a gas turbine engine, the exhaust nozzle comprising
an outer shroud arranged circumferentially about an axis to define an outer boundary surface of an exhaust nozzle flow path,
a nozzle-plug assembly including an inner plug arranged circumferentially about the axis to define an inner boundary surface of the exhaust nozzle flow path and a support vane that extends between the outer shroud and the inner plug through the exhaust nozzle flow path, the inner plug including a plug support frame and an outer vane shell, and the support vane including a vane support frame and an outer vane shell, and
an expansion-permissive link that interconnects the plug support frame and the vane support frame to transfer loads from the inner plug, through the support vane, and to the outer shroud,
wherein the expansion-permissive link is configured to allow movement of the support vane relative to the plug support frame between a cold-build state position, in which the vane support frame is spaced apart from the plug support frame by a first distance, and a hot-use state position, in which the vane support frame is spaced apart from the plug support frame by a second distance less than the first distance, and
wherein the vane-support frame includes a plurality of support beams and an endplate coupled to the plurality of support beams, and the expansion-permissive link interconnects the plug support frame to the plurality of support beams and the endplate of the vane-support frame.

7. The exhaust nozzle of claim 6, wherein the expansion-permissive link includes a load shaft that extends through apertures formed in both the endplate and the plug-support frame, a first bearing sleeve positioned between the load shaft and the endplate of the vane-support structure, and a second bearing sleeve positioned between the load shaft and the plug-support frame.

8. The exhaust nozzle of claim 7, wherein the load shaft is configured to translate relative to the first and second bearing sleeves as the exhaust nozzle changes between the cold-build state and a hot-use state.

9. The exhaust nozzle of claim 7, wherein the outer plug shell defines a vane-receiving space and receives a portion of the outer vane shell therein and the outer vane shell translates relative to the outer plug shell as the exhaust nozzle changes between the cold-build state and a hot-use state.

10. The exhaust nozzle of claim 6, wherein the nozzle-plug assembly includes a first support vane and a second support vane that each interconnect the inner plug and the outer shroud and the expansion-permissive link includes a first support rod coupled to the first support vane and a second support rod coupled to the second support vane.

11. The exhaust nozzle of claim 10, wherein the first support rod and the second support rod are coupled together and extend axially forward and radially away from the axis to provide a v-shaped expansion-permissive link that allows thermal growth of the first and second vanes in axial and radial directions relative to the axis.

12. The exhaust nozzle of claim 6, wherein the plurality of support beams include a first set of support beams that extend forward from the inner plug at an acute angle relative to the axis and a second set of support beams that extend transversely to the first set of support beams.

13. The exhaust nozzle of claim 12, wherein each of the support beams of the second set interconnect at least two of the support beams of the first set.

14. The exhaust nozzle of claim 13, wherein each of the support beams of the second set extend perpendicularly to each of the support beams of the first set.

15. A gas turbine engine comprising
an engine core including a compressor configured to receive and compress an airflow, a combustor configured to receive a compressed airflow from the compressor and combust the compressed airflow to produce hot, high-pressure combustion products, and a turbine configured to interact with the high-pressure combustion products, and
an exhaust nozzle configured to receive the high-pressure combustion products from the engine core and discharge the high-pressure combustion products to the atmosphere, the exhaust nozzle including an outer shroud arranged circumferentially about an axis to define an outer boundary surface of an exhaust nozzle flow path and a nozzle-plug assembly arranged in the exhaust nozzle flow path,
wherein the nozzle-plug assembly includes an inner plug arranged circumferentially about the axis to define an inner boundary surface of the exhaust nozzle flow path, at least one support vane that extends between the outer shroud and the inner plug through the exhaust nozzle flow path, and an expansion-permissive link that interconnects the inner plug to the support vane to support the inner plug in the exhaust nozzle flow path while allowing thermal expansion and contraction of the inner plug and the support vane relative to one another,
wherein the expansion-permissive link is angularly fixed relative to the axis and extends at least partway through the inner plug and the at least one support vane, and wherein both the support vane and the inner plug are configured to translate relative to and along the expansion-permissive link during thermal expansion of the nozzle-plug assembly.

16. The gas turbine engine of claim 15, wherein the support vane includes a vane-support frame that interconnects the outer shroud and the inner plug to support the inner plug in the exhaust nozzle flow path and an outer vane shell coupled to the vane-support frame to provide an outer flow path boundary for the at least one support vane.

17. The gas turbine engine of claim 16, wherein the plurality of support beams include a first set of support beams that extend forward from the inner plug at an acute angle relative to the axis and a second set of support beams that extend transversely to the first set of support beams.

18. The gas turbine engine of claim 17, wherein each of the support beams of the second set interconnect at least two of the support beams of the first set.

19. The gas turbine engine of claim 17, wherein each of the support beams of the second set extend perpendicularly to each of the support beams of the first set.

20. The gas turbine engine of claim 15, wherein the at least one support vane is coupled to a track included in the outer shroud and wherein the at least one support vane is configured to translate radially inward toward the axis and axially aft away from the engine core during thermal expansion of the nozzle-plug assembly.

\* \* \* \* \*